United States Patent [19]

Ishino et al.

[11] Patent Number: 4,829,119

[45] Date of Patent: May 9, 1989

[54] SELF-EXTINGUISHING POLYMER COMPOSITION

[75] Inventors: Iwao Ishino; Noriaki Hattori, both of Yokkaichi, Japan

[73] Assignee: Mitsubishi Petrochemical Co., Ltd., Tokyo, Japan

[21] Appl. No.: 126,017

[22] Filed: Nov. 27, 1987

[30] Foreign Application Priority Data

Nov. 29, 1986 [JP] Japan .................. 61-284960

[51] Int. Cl.$^4$ ............................................. C08K 3/22
[52] U.S. Cl. ........................................ 524/436; 523/434
[58] Field of Search ............ 523/434, 437, 443, 457; 524/269, 436; 525/187, 208; 526/273

[56] References Cited

U.S. PATENT DOCUMENTS

| | | | |
|---|---|---|---|
| 2,992,193 | 7/1961 | Porret et al. | 526/273 |
| 2,992,201 | 7/1961 | Gober | 524/269 |
| 3,639,365 | 2/1972 | Adelman | 526/273 |
| 3,795,646 | 3/1974 | MacKenzie et al. | 524/269 |
| 4,094,831 | 6/1978 | Sandstrom | 526/273 |
| 4,147,690 | 4/1979 | Rich | 524/437 |
| 4,292,222 | 9/1981 | Grigo et al. | 524/269 |
| 4,430,470 | 2/1984 | Taniguichi et al. | 524/269 |
| 4,455,407 | 6/1984 | Yamane et al. | 525/208 |
| 4,461,871 | 7/1984 | Kometani et al. | 523/437 |
| 4,511,698 | 4/1985 | Matoba et al. | 525/187 |
| 4,533,687 | 8/1985 | Itoh et al. | 524/269 |

FOREIGN PATENT DOCUMENTS

| | | |
|---|---|---|
| 51-46341 | 4/1976 | Japan . |
| 53-54243 | 5/1978 | Japan . |
| 58-45245 | 3/1983 | Japan . |
| 58-129039 | 8/1983 | Japan . |
| 59-58048 | 4/1984 | Japan . |

OTHER PUBLICATIONS

Flame-Retardant Polymeric Materials—pp. 15–17, 376–380, Menachem Lewin et al., editor, Plenum Press, (1975).

*Primary Examiner*—Veronica P. Hoke
*Attorney, Agent, or Firm*—Oblon, Fisher, Spivak, McClelland & Maier

[57] ABSTRACT

The present invention provides self-extinguishing polymer compositions containing components A, B, and C described below, characterized in that the proportions of components A and B are 90 to 99.99 wt % and 10 to 0.01 wt %, respectively, relative to the total amount of components A and B, and the proportion of component C is 35 to 80 wt % relative to the total amount of components A, B, and C.

Component A: thermoplastic resins or elastomers other than component B described below or mixtures thereof Component B: copolymers comprising ethylene and 0.5 to 50% by weight of ethylenic unsaturated epoxy compounds Component C: magnesium hydroxide granules having an average size of 0.2 to 2 microns.

11 Claims, No Drawings

SELF-EXTINGUISHING POLYMER COMPOSITION

BACKGROUND OF THE INVENTION

The present invention relates to self-extinguishing polymer compositions which are suitable for fields such as wire coating, extrusion molding of pipes, and injection molding of the casing of domestic appliances and wire connectors, and which are much practicable from the viewpoint of the mechnical properties.

In recent years, demands for the flameproofing of resin materials used as wire cables have greatly increased.

In one method of flameproofing thermoplastic resins or elastomers, antimony oxide and a halide are blended, but the self-extinguishing compositions obtained by this method generate toxic gases during a fire.

Therefore, attention is being paid to magnesium hydroxide which generates no toxic gases and raises no problem with respect to toxicity when it is used as an additive.

A method of imparting flame retardant properties to thermoplastic resins or elastomers by blending them with magnesium hydroxide is previously known, and it is also known that the flame retardancy of the compositions can be improved by blending them with carbon black (Japanese Patent Laid-Open No. 46341/1976).

However, a large amount of magnesium hydroxide is required for imparting sufficient flame retardancy, and, consequently, this method has the disadvantage in that it is difficult to obtain compositions having satisfactory practical properties, considering that a resin composition containing a large amount of magnesium hydroxide whitens when an external force is applied thereto and exhibits low resistance to external damage.

SUMMARY OF THE INVENTION

As a result of detailed investigations performed with the view of solving the above-described disadvantages of resin compositions containing large amounts of magnesium hydroxide, it has been found that only compositions comprising a thermoplastic resin or elastomer as a base resin and specific amounts of specific ethylene copolymers containing epoxy groups and fine magnesium hydroxide can achieve this object, leading to the achievement of the present invention.

In other words, self-extinguishing polymer compositions of the present invention are characterized by containing components A to C described below, the proportions of components A and B being 90 to 99.99% by weight and 10 to 0.01% by weight, respectively, relative to the total amount of the components A and B, and the proportion of component C being 35 to 80% by weight relative to the total amount of components A, B, and C.

Component A: thermoplastic resins or elastomers other than component B, or mixtures thereof
Component B: copolymers comprising ethylene and 0.5 to 50% by weight of ethylenic unsaturated epoxy compounds
Component C: magnesium hydroxide granules having an average size of 0.2 to 2 microns

DETAILED DESCRIPTION OF THE INVENTION

Examples of thermoplastic resins or elastomers used as the above-described component A in the present invention include α-olefin polymers such as homopolymers or mutual copolymers of α-olefins such as ethylene, propylene, butene, methylpentene, and hexene, or compolymers of these α-olefins with 50 wt % or less of other comonomers; styrene-based polymers such as polystyrene, ABS resins, AS resins, SBR and SBS block copolymers, and SIR; halogen-containing polymers such as vinyl chloride resins, vinylidene chloride resins, and fluorine resins; vinyl alcohol-based polymers such as polyvinyl alcohol and ethylene-vinyl alcohol; acrylic polymers such as methacrylic resins, acrylonitrile resins, and acrylic rubber; vinyl ester-based polymers such as polyvinyl acetal and polyvinyl butyral; polyamides; polycarbonates; thermoplastic polyesters; polyethers; diene rubbers such as butadine rubber, isoprene rubber, and neoprene rubber; and natural rubber.

Among these polymers, α-olefin polymer resins or elastomers such as polyethylene, polypropylene, ethylene-propylene copolymer rubber, ethylene-propylene-diene copolymer rubber, ethylene-propylene copolymer resins, ethylene-vinyl acetate copolymer resins, ethylene-methyl acrylate copolymer resins, ethylene-methyl methacrylate resins, and ethylene-ethyl acrylate resins are preferable, from the viewpoint of molding properties and uniformity of dispersion.

In particular, of the α-olefin polymer resins, straight-chain ethylene polymers having a density of 0.850 to 0.915 g/cm$^3$, ethylene polymers which contain 1 to 40% by weight of vinyl acetate and exhibit a melt flow rate (MFR) of 0.05 to 50 g/10 minutes, and ethylene polymers which contain 1 to 40% by weight of alkyl acrylates or alkyl methacrylates and exhibit an MFR of 0.05 to 50 g/10 minutes are preferable from the viewpoint of the remarkable effect obtained by the present invention.

Examples of copolymers comprising ethylene and 0.5 to 50% by weight of ethylenic unsaturated epoxy compounds used as component B in the present invention include copolymers comprising ethylene and glycidyl unsaturated carboxylic acids or glycidyl unsaturated carboxylates. Of these copolymers, copolymers containing glycidyl methacrylate and/or glycidyl acrylate as the ethylenic unsaturated epoxy compound are particularly preferable.

The copoylmers used as component B may also be copolymers containing other copolymerizable momoners as an optional component. In particular, compounds expressed by Formula (I) or (II) described below are preferably used as any optional components, the proportions thereof being preferably within the range of 0.1 to 40% by weight.

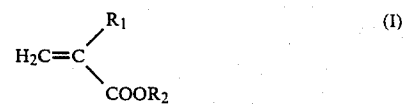

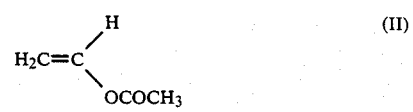

(wherein R$_1$ denotes H or CH$_3$ and R$_2$ denotes H or an alkyl group having 6 or few carbon atoms).

The "copolymer" used as component B may have any of the forms of a random, graft, and block copolymer, and this applies to the "copolymer" used as the thermoplastic resin or elastomer of component A.

Magnesium hydroxide used as component C of the present invention has an average grain size of 0.2 to 2 microns, preferably 0.5 to 1 microns, and the surfaces thereof may be treated before use.

With regard to the compositions of components A (thermoplastic resin or elastomer), B (ethylene copolymer containing epoxy groups), and C (magnesium hydroxide), the proportions of components A and B are 90 to 99.99% by weight and 10 to 0.01% by weight, respectively, relative to the total amount of components A and B, and the proportion of component C is 35 to 80% by weight relative to the total amount of components A, B, and C. It is preferable that the proportion of component A is 95 to 99.95% by weight, the proportion of component B is 5 to 0.05% by weight, and the proportion of component C is 45 to 65% by weight.

If the proportion of component B is too small, it can hardly be expected that the deterioration of properties (whitening or resistance to external damages) is prevented, and if it is too large, the tensile elongation of the polymer composition is greatly decreased.

If the proportion of component C is below the above-described range, the obtained polymer composition is not self-extinguishing, and if it is above the above-described range, its molding properties are greatly deteriorated.

Other additional components can be contained in the compositions of the present invention, in amounts within a range which does not deteriorate the effects obtained by the present invention. Examples of additional components include antioxidants, lubricants, copper inhibitors, neutralizing agents, ultraviolet absorbing agents, coloring agents, crosslinking agents, and inorganic fillers.

In particular, a composition containing carbon black as an additional component, in an amount of 0.05 to 20 parts by weight relative to 100 parts by weight of the composition of the present invention, and a composition containing as an additional component silicone oil (preferably having an average molecular weight of about 500 to 30,000) such as dimethyl polysiloxane or silicone diol, in an amount of 0.05 to 10 parts by weight relative to 100 parts by weight of the composition of the present invention, exhibit improved flame retardant properties, without their molding properties and mechanical strength being deteriorated.

The compositions of the present invention are produced by mixing the above-described essential components and, if required, additional components, and kneading the mixtures by an ordinary kneading method such as an extruder, rolls, or a Banbury mixer.

Any desired sequence of mixing can be used, but a method in which all the components are mixed together by dry blending then kneaded is preferable. When carbon black is used, it is preferable to use a method in which a master batch is previously produced by kneading carbon black with a resin, then the master batch is mixed with a mixture comprising components A, B, and C or a method in which a mixture comprising A, B, and C is dry-blended with carbon black powder and the thus-obtained blend is kneaded.

Pellets of the compositions of the present invention are generally used for molding, but the molding can be performed after the mixing or during the mixing if the master batch method or the dry blending method is used.

The present invention provides compositions which exhibit improved extinguishing properties, tensile strengths, tensile elongations, inhibition of whitening, and resistance to external damage and are obtained by mixing thermoplastic resins or elastomers with specific amounts of ethylene copolymers containing epoxy groups and fine granules of magnesium hydroxide. The thus-obtained compositions are extremely effective in providing excellent practical properties.

EXAMPLES

Example 1

Each of the compositions shown in Table 1 was formed by kneading the correponding components in a Banbury mixer at 160° C. for 10 minutes then granulating the mixture.

Each obtained composition was formed into press sheets having each of thicknesses suitable for evaluating tensile strength at fracture, tensile elongation at fracture, whitening, resistance to external damage, and oxygen index. The results of these evaluations are shown in Table 1.

The method used for the evaluations are as follows:

(A) Tensile strength and tensile elongation: in accordance with JIS K6760 (1-mm thick sheet; tensile speed, 200 mm/min).

(B) Whitening: A 1-mm thick sheet was bent through an angle of 120° by applying an appropriate force thereto, and its appearance was then observed visually. The evaluation decision was based on the assumption that a sheet showing no or substantially no whitening is excellent, a sheet showing a little whitening is good, and a sheet showing much whitening is poor.

(C) Resistance to external damage: A pencil having hardness H was set in a pencil scratch test device, a test piece of a 2-mm thick sheet was subjected to scratching from the pencil while a load of 200 g was applied thereto, and the marks of the scratch were observed visually. The evaluation decision was based on the assumption that a sheet showing hardly any damage is good, and a sheet showing clearly damage is poor.

(D) Oxygen index: in accordance with JIS K7201 (3-mm thick sheet).

The components shown in the table were as follows:

Thermoplastic resin or elastomer

Resin-1: ethylene-butene-1 copolymer (straight-chain ethylene polymer) having a density of 0.902 g/cm$^3$ and an MFR of 0.99 g/10 minutes Resin-2: ethylene-vinyl acetate copolymer containing 15% by weight of vinyl acetate and having an MFR of 0.50 g/10 minutes Resin-3: ethylene-methyl acrylate copolymer containing 12% by weight of methyl acrylate and having an MFR of 0.40 g/10 minutes Resin-4: ethylene-ethyl acrylate compolymer containing 12% by weight of ethyl acrylate and having an MFR of 0.30 g/10 minutes Ethylene copolymers containing epoxy groups EGV-1: ethylene-glycidyl methacrylate-vinyl acetate copolymer containing 10% by weight of glycidyl methacrylate and 10% by weight of vinyl acetate EG-1: ethylene-glycidyl methacrylate copolymer containing 10% by weight of glycidyl methacrylate EG-2: ethylene-glycidyl acrylate copolymer containing 25% by weight of glycidyl acrylate EG-3: ethylene-glycidyl methacrylate copolymer containing 60% by weight of glycidyl methacrylate
EG-4: ethylene-glycidyl methacrylate copolymer containing 0.05% by weight of glycidyl methacrylate Magnesium hydroxide $Mg(OH)_2$: average grain size of 0.6 micron with untreated surfaces temperature brittle temperature, and oxygen index. The results of these evaluations are shown in Table 2.

The method of evaluating the low-temperature brittle temperature was in accordance with JIS-K6760 (2-mm thick sheet), and the methods of the other evaluations were the same as those of Example 1.

The components used in this example, other than the components used in Example 1, are as follows:

TABLE 1

| Example | Comparative Example | Composition Component A (wt %)*1 | Component B (wt %)*1 | Component C (wt %)*2 | Tensile strength at fracture kg/mm² | Tensile elongation % | Whitening | Resistance to external damage | Oxygen index |
|---|---|---|---|---|---|---|---|---|---|
| 1 |  | Resin-1 (99.8) | EGV-1 (0.2) | Mg(OH)₂ (55) | 1.4 | 650 | good | good | 30 |
| 2 |  | Resin-1 (99.6) | EGV-1 (90.4) | MG(OH)₂ (55) | " | " | excellent | " | " |
| 3 |  | Resin-1 (99.6) | EG-1 (0.4) | Mg(OH)₂ (55) | " | 600 | " | " | " |
| 4 |  | Resin-1 (99.9) | EG-2 (0.1) | Mg(OH)₂ (55) | " | 200 | " | " | " |
| 5 |  | Resin-1 (93) | EGV-1 (7) | Mg(OH)₂ (55) | 1.9 | 190 | " | " | " |
| 6 |  | Resin-2 (99.8) | EGV-1 (0.2) | Mg(OH)₂ (55) | 1.1 | 250 | " | " | 32 |
| 7 |  | Resin-3 (99.8) | EGV-1 (0.2) | Mg(OH)₂ (55) | " | 200 | " | " | 30 |
| 8 |  | Resin-4 (99.8) | EGV-1 (0.2) | Mg(OH)₂ (55) | " | " | good | " | " |
| 9 |  | Resin-1 (99.8) | EGV-1 (0.2) | Mg(OH)₂ (55) | 1.4 | 650 | " | " | 33 |
| 10 |  | Resin-1 (99.6) | EGV-1 (0.4) | Mg(OH)₂ (55) | " | " | excellent | " | " |
| 11 |  | Resin-1 (99.6) | EG-1 (0.4) | Mg(OH)₂ (55) | " | 600 | " | " | " |
|  | 1 | Resin-1 (100) | — | Mg(OH)₂ (55) | 1.3 | 650 | poor | poor | 30 |
|  | 2 | Resin-1 (99.995) | EGV-1 (0.005) | Mg(OH)₂ (55) | " | " | " | " | " |
|  | 3 | Resin-1 (85) | (15) | Mg(OH)₂ (55) | 1.9 | 50 | good | good | " |
|  | 4 | Resin-1 (99) | EG-3 (1) | Mg(OH)₂ (55) | 1.8 | " | " | " | " |
|  | 5 | Resin-1 (99) | EG-4 (1) | Mg(OH)₂ (55) | 1.3 | 600 | poor | poor | " |
|  | 6 | Resin-2 (100) | — | Mg(OH)₂ (55) | 0.9 | 450 | " | " | 32 |
|  | 7 | Resin-3 (100) | — | Mg(OH)₂ (55) | 0.8 | " | " | " | 30 |
|  | 8 | Resin-4 (100) | — | Mg(OH)₂ (55) | 0.9 | " | " | " | " |
|  | 9 | Resin-1 (99.6) | EG-1 (0.4) | Mg(OH)₂ (30) | 1.5 | 720 | good | good | 20 |
|  | 10 | Resin-1 (99.6) | EG-1 (0.4) | Mg(OH)₂ (85) | 0.6 | 400 | poor | poor | 35 |

(Note)
*1 The values relative to the total amounts of components A and B.
*2 The values relative to the total amounts of components A, B, and C.
In Examples 9–11 compositions in which carbon black was mixed in an amount of 2.5 parts by weight relative to 100 parts by weight of the total amounts of components A, B, and C were used.

Examples 1 to 11 proved to be satisfactory with respect to all of the practical properties.

Of Examples 1 to 11, Examples 1 to 3 and 9 to 11 showed excellent tensile elongation. In addition, Examples 9, 10, and 11 which are examples obtained by mixing carbon black with the compositions of Examples 1, 2, and 3, respectively, to further improve their self-extinguishing properties, showed that an effect of improving the self-extinguishing properties of the compositions can be expected if an appropriated amount of carbon black is mixed therewith.

On the other hand, Comparative Examples 1, 2 and 5 to 8 proved to be poor with respect to tensile elongation, whitening, and resistance to external damage. Comparative Examples 3 and 4 proved to be good with respect to tensile strength, whitening, and resistance to external damage, but were poor with respect to tensile elongation. In addition, in Comparative Example 9, an insufficient flame retardant property was imparted, and, in Comparative Example 10, the tensile strength, inhibition of whitening, and resistance to external damage were poor.

Example 2

Each of the compositions shown in Table 2 was formed by kneading the corresponding components in a Banbury mixer at 160° C. for 10 minutes then granulating the mixture.

Each thus-obtained composition was formed into press sheets having each of thicknesses suitable for evaluating tensile strength at fracture, tensile elongation at fracture, whitening, resistance to external damage, low- Thermoplastic resin or elastomer Resin-5: ethylene-methyl acrylate copolymer showing an MFR of 2.0 g/10 minutes and containing 18% by weight of methyl acrylate
Resin-6: ethylene-vinyl acetate copolymer showing an MFR of 20 g/10 minutes and containing 2.5% by weight of vinyl acetate Ethylene copolymer containing epoxy groups EGV-2: ethylene-glycidyl methacrylate-vinyl acetate copolymer containing 3% by weight of glycidyl methacrylate and 8% by weight of vinyl aceate
EG-5: ethylene-glycidyl methacrylate copolymer containing 25% by weight of glycidyl methacrylate In the results of the tests, Examples 12 to 23 proved to be satisfactory with respect to all of the practical properties. Of Examples 12 to 23, Examples 12 to 15 exhibited very excellent tensile strength, tensile elongation, whitening inhibition, and resistance to external damage at the same time.

It was therefore found that when a compolymer, other than Component B, comprising ethylene and at least one monomer selected from unsaturated carboxylic acids and derivatives and vinyl esters thereof is used as component A, the composition having very excellent practicability can be obtained.

In addition, Examples 20 and 23 which were examples in which their flame retardant properties were further improved by mixing carbon black and silicone oil with the compositions of Examples 14 and 15, respectively, showed that the effect of greatly improving the flame retardant properties of the compositions can be expected if an appropriate amount of carbon black or silicone oil is used together therewith.

On the other hand, Comparative Example 14 was poor with respect the low-temperature brittle temperature, Comparative Example 11 was poor with respect to the oxygen index, Comparative Example 12 was poor with respect to the tensile strength, inhibition of whitening, and resistance to external damage, and Comparative Example 13 was poor with respect to the inhibition of whitening and resistance to external damage.

Component C: magnesium hydroxide granules having an average size of 0.2 to 2 microns.

2. A self-extinguishing polymer composition according to claim 1, wherein the proportions of said components A and B are 95 to 99.95 wt % and 5 to 0.05 wt %, respectively, relative to the total amount of said components A and B, and the proportion of said component C is 45 to 65 wt % relative to the total amount of said components A, B, and C.

3. A self-extinguishing polymer composition according to claim 1, wherein said α-olefin polymer resin is a

TABLE 2

| Example | Comparative Example | Composition | | | Tensile strength at fracture kg/mm² |
|---|---|---|---|---|---|
| | | Component A (wt %)*1 | Component B (wt %)*1 | Component C (wt %)*2 | |
| 12 | | Resin-1 (89.64) | Resin-5 (9.94) | EGV-2 (0.42) | Mg(OH)₂(54.91) | 1.2 |
| 13 | | Resin-1 (94.88) | Resin-5 (4.99) | EGV-2 (0.13) | Mg(OH)₂(55.00) | 1.2 |
| 14 | | Resin-1 (97.89) | Resin-5 (1.98) | EGV-2 (0.13) | Mg(OH)₂(54.97) | 1.5 |
| 15 | | Resin-1 (97.89) | Resin-5 (1.98) | EG-5 (0.13) | Mg(OH)₂(54.97) | 1.4 |
| 16 | | Resin-1 (97.89) | Resin-4 (1.98) | EG-5 (0.13) | Mg(OH)₂(54.97) | 1.2 |
| 17 | | Resin-1 (69.91) | Resin-5 (29.96) | EG-5 (0.13) | Mg(OH)₂(54.98) | 1.2 |
| 18 | | Resin-1 (95.91) | Resin-6 (1.93) | EG-5 (2.16) | Mg(OH)₂(54.47) | 1.3 |
| 19 | | Resin-1 (98.01) | Resin-5 (1.98) | EG-5 (0.01) | Mg(OH)₂(55.00) | 1.4 |
| | 11 | Resin-1 (98.01) | Resin-5 (1.91) | EG-5 (0.08) | Mg(OH)₂(27.60) | 1.5 |
| | 12 | Resin-1 (97.61) | Resin-5 (1.99) | EG-5 (0.40) | Mg(OH)₂(84.99) | 0.6 |
| | 13 | Resin-1 (98.02) | Resin-5 (1.979) | EG-5 (0.001) | Mg(OH)₂(55.00) | 1.3 |
| | 14 | Resin-1 (91.75) | Resin-5 (8.249) | EG-5 (0.001) | Mg(OH)₂(53.37) | 1.9 |
| 20*3 | | Resin-1 (97.89) | Resin-5 (1.98) | EGV-2 (0.13) | Mg(OH)₂(54.97) | 1.5 |
| 21*3 | | Resin-1 (97.89) | Resin-5 (1.98) | EG-5 (0.13) | Mg(OH)₂(54.97) | 1.4 |
| 22*4 | | Resin-1 (97.89) | Resin-5 (1.98) | EGV-2 (0.13) | Mg(OH)₂(54.97) | 1.5 |
| 23*4 | | Resin-1 (97.89) | Resin-5 (1.98) | EG-5 (0.13) | Mg(OH)₂(54.97) | 1.4 |

| Example | Comparative Example | Tensile elongation % | Whitening | Resistance to external damage | Low-temperature brittle temperature °C. | Oxygen index |
|---|---|---|---|---|---|---|
| 12 | | 500 | excellent | good | −55 | 31 |
| 13 | | 500 | excellent | good | −57 | 30 |
| 14 | | 700 | excellent | good | −56 | 30 |
| 15 | | 650 | excellent | good | −52 | 30 |
| 16 | | 600 | good | good | −51 | 30 |
| 17 | | 250 | excellent | good | −61 | 32 |
| 18 | | 400 | good | good | −50 | 30 |
| 19 | | 700 | good | good | −50 | 30 |
| | 11 | 700 | good | good | −60 | 20 |
| | 12 | 400 | poor | poor | −25 | 35 |
| | 13 | 650 | poor | poor | −45 | 30 |
| | 14 | 50 | good | good | −30 | 30 |
| 20*3 | | 700 | excellent | good | −56 | 33 |
| 21*3 | | 650 | excellent | good | −52 | 33 |
| 22*4 | | 700 | excellent | good | −56 | 39 |
| 23*4 | | 650 | excellent | good | −52 | 39 |

(Note)
*1 The values relative to the total amounts of components A and B.
*2 The values relative to the total amounts of components A, B, and C.
*3 Carbon black was mixed in an amount of 2.5 parts by weight relative to 100 parts by weight of the total amounts of components A, B, and C shown in Table 2.
*4 2.5 parts by weight of carbon black and 1.0 parts by weight of dimethyl polysiloxane (silicone oil having an average molecular weight of $2.55 \times 10^4$) were mixed with 100 parts by weight of the compositions shown in Table 2.

We claim:

1. A self-extinguishing polymer composition containing components A, B, and C, characterized in that the proportions of said components A and B are 90 to 99.99 wt % and 10 to 0.01 wt %, respectively, relative to the total amount of said components A and B, and the proportion of said component C is 35 to 80 wt % relative to the total amount of said components A, B, and C, Component A: thermoplastic resins or elastomers of an alpha-olefin polymer other than component B or mixtures thereof Component B: copolymers comprising ethylene and 0.5 to 50% by weight of glycidyl methacrylate, glycidyl acrylate or mixtures thereof straight-chain ethylene polymer having a density of 0.850 to 0.915 g/cm³.

4. A self-extinguishing polymer composition according to claim 1, wherein said α-olefin polymer is an ethylene copolymer containing 1 to 40 wt % of vinyl acetate and showing a melt flow rate of 0.05 to 50 g/10 minutes.

5. A self-extinguishing polymer composition according to claim 1, wherein said α-olefin polymer is an ethylene copolymer containing 1 to 40 wt % of an alkyl acrylate or an alkyl methacrylate and showing a melt flow rate of 0.05 to 50 g/10 minutes.

6. A self-extinguishing polymer composition according to claim 1 or 2, wherein average grain size of magnesium hydroxide is 0.5 to 1 micron.

7. A self-extinguishing polymer composition according to claim 1 or 2, wherein carbon black in an amount of 0.05 to 20 parts by weight relative to the total component is contained as an further additive.

8. A self-extinguishing polymer composition according to claim 7, wherein the content of the carbon black is 1 to 10.

9. A self-extinguishing polymer composition according to claim 1 or 2, wherein silicon oil in an amount of 0.05 to 10 parts by weight relative to the total component is contained as an further additive.

10. A self-extinguishing polymer composition according to claim 11, wherein the average molecular weight of the silicon oil is 300 to 30,000.

11. A self-extinguishing polymer composition according to claim 1 or 2, containing carbon black and silicon oil as the further additives, wherein the amounts of said carbon black and said silicon oil are 1 to 10 parts by weight and 0.05 to 10 parts by weight, respectively, relative to the total component.

* * * * *